United States Patent
Williamson

(10) Patent No.: US 9,518,681 B2
(45) Date of Patent: Dec. 13, 2016

(54) FIXTURE FOR A SINK

(71) Applicant: Dyson Technology Limited, Wiltshire (GB)

(72) Inventor: Steven Grant Williamson, Malmesbury (GB)

(73) Assignee: Dyson Technology Limited, Wiltshire (GB)

( * ) Notice: Subject to any disclaimer, the term of this patent is extended or adjusted under 35 U.S.C. 154(b) by 426 days.

(21) Appl. No.: 13/762,012

(22) Filed: Feb. 7, 2013

(65) Prior Publication Data
US 2013/0199640 A1  Aug. 8, 2013

(30) Foreign Application Priority Data

Feb. 8, 2012 (GB) .................................. 1202180.4

(51) Int. Cl.
*E03C 1/05* (2006.01)
*F16L 3/00* (2006.01)
*E03C 1/04* (2006.01)

(52) U.S. Cl.
CPC . *F16L 3/00* (2013.01); *E03C 1/04* (2013.01); *A47K 2210/00* (2013.01); *Y10T 137/87153* (2015.04)

(58) Field of Classification Search
CPC ............... E03C 1/057; Y10T 137/8593; Y10T 137/9464; Y10T 137/87153
USPC .............. 137/801, 561 R, 561 A; 4/638, 678
See application file for complete search history.

(56) References Cited

U.S. PATENT DOCUMENTS

| | | | | |
|---|---|---|---|---|
| 1,982,258 A | * | 11/1934 | Martin | A61H 33/025 261/124 |
| 3,151,340 A | * | 10/1964 | Teshima | 251/129.04 |
| 3,642,176 A | * | 2/1972 | Dreibelbis et al. | 222/146.5 |
| 6,588,228 B2 | * | 7/2003 | Choi | 62/426 |
| D634,405 S | * | 3/2011 | Shieh | D23/242 |

(Continued)

FOREIGN PATENT DOCUMENTS

| | | |
|---|---|---|
| DE | 36 26 579 | 2/1988 |
| GB | 1 543 484 | 4/1979 |

(Continued)

OTHER PUBLICATIONS

International Search Report and Written Opinion mailed Apr. 9, 2013, directed to International Application No. PCT/GB2013/050080; 9 pages.

(Continued)

*Primary Examiner* — Atif Chaudry
(74) *Attorney, Agent, or Firm* — Morrison & Foerster LLP

(57) ABSTRACT

A fixture for delivering a first fluid over the basin of a sink includes a supply inlet and a delivery outlet for the fluid, the inlet connected to the outlet through a hollow body of the fixture, the hollow body including two straight, hollow metal tubes: a first tube arranged to be mounted next to the basin of the sink in use, and a second tube joined to the wall of the first tube so as to project out over the basin of the sink in use. One or more inserts are provided inside the first metal tube and together define a curved elbow duct inside the first metal tube for guiding the fluid from the first metal tube into the second metal tube. The tubes can be cut at relatively low cost from conventional rolled steel tubing, and the curved elbow duct limits pressure losses inside the first tube.

11 Claims, 5 Drawing Sheets

(56) References Cited

U.S. PATENT DOCUMENTS

| | | | |
|---|---|---|---|
| 8,296,875 B2* | 10/2012 | Loberger et al. | 4/623 |
| 2009/0007977 A1* | 1/2009 | Wildfang | 137/801 |
| 2010/0018588 A1* | 1/2010 | Lee | A47K 3/28 |
| | | | 137/338 |
| 2010/0139796 A1 | 6/2010 | DeVries et al. | |

FOREIGN PATENT DOCUMENTS

| | | |
|---|---|---|
| JP | 5-163748 | 6/1993 |
| JP | 2001-140305 | 5/2001 |
| JP | 2003-119844 | 4/2003 |
| JP | 3093071 | 4/2003 |
| JP | 2012-2027 | 1/2012 |
| KR | 10-2010-0038334 | 4/2010 |
| WO | WO-01/48326 | 7/2001 |
| WO | WO-2011/074018 | 6/2011 |
| WO | WO-2012/013318 | 2/2012 |
| WO | WO-2012/030216 | 3/2012 |

OTHER PUBLICATIONS

Search Report dated Apr. 16, 2012, directed towards GB Application No. 1202180.4; 2 pages.

* cited by examiner

FIXTURE FOR A SINK

REFERENCE TO RELATED APPLICATIONS

This application claims the priority of United Kingdom Application No. 1202180.4, filed Feb. 8, 2012, the entire contents of which are incorporated herein by reference.

FIELD OF THE INVENTION

The present invention relates to a fixture for a sink.

The fixture may be a tap delivering water for washing, but more particularly the invention is concerned with a fixture which delivers a jet of drying air for drying a user's hands, preferably in addition to delivering water.

BACKGROUND OF THE INVENTION

Conventional metal fixtures are often cast from brass. Casting has the disadvantage that it involves very high capital costs. It would be convenient therefore to provide a fixture which can be manufactured cost-effectively even at relatively low volumes.

SUMMARY OF THE INVENTION

According to the invention, there is provided a fixture for delivering a first fluid over the basin of a sink, the fixture comprising a supply inlet for the fluid and a delivery outlet for the fluid, the inlet being connected to the outlet through a hollow body of the fixture, the hollow body comprising two straight, hollow metal tubes: a first tube arranged to be mounted next to the basin of the sink in use, and a second tube joined to the wall of the first tube so as to project out over the basin of the sink in use, one or more inserts being provided inside the first metal tube, which inserts together define a curved elbow duct inside the first metal tube for guiding the fluid from the first metal tube into the second metal tube.

The fixture has the advantage that the two straight hollow, metal tubes can be cut from conventional rolled metal tubing, and can therefore be produced cost-effectively at low volumes. At the same time, however, the curved elbow duct inside the first tube nevertheless provides a smooth internal transition between the first and second tube in order to limit pressure losses between the fluid inlet and the fluid outlet.

The tubes may be cut from rolled stainless steel tubing, though this is not essential. The insert(s) can be produced cheaply using a foam material such as expanded polystyrene (EPC) foam. The use of a foam material has the additional advantage that it provides a degree of heat insulation and noise absorption. The use of foam is not essential: a moulded plastic insert may alternatively be used, for example.

The fluid may be water for washing a user's hands at the sink.

Alternatively, the fluid may be air for drying a user's hands over the sink. In this sort of arrangement, the fixture is provided in combination with a motor-driven fan unit, the delivery outlet takes the form of an air nozzle, and the fan unit is connected to the supply inlet for forcing drying air through the air nozzle, via the curved elbow duct.

Minimising pressure losses between the fluid inlet and the fluid outlet is particularly advantageous in this sort of arrangement, where the output pressure of the motor-driven fan will typically be in the region of 10-50 KPa (compared to nearly 500 KPa for a typical mains water pressure in the UK). By reducing pressure losses upstream of the fluid outlet, higher exit airspeeds can be maintained, for effective drying performance.

The arrangement may comprises a plurality of air nozzles. These air nozzles may be provided on branch tubes joined to the second tube. Again, these branch tubes may be cut from conventional rolled metal tubing at relatively low cost. The air nozzles themselves may be holes drilled or laser-cut into the walls of the branch tubes.

The fixture may be arranged for additionally delivering a second fluid over the basin of the sink, the fixture comprising a second delivery outlet for separate delivery of the second fluid, the second delivery outlet being arranged for connection to a respective fluid supply for supplying the second fluid. So, in the arrangement above in which air is delivered through air nozzles on the fixture, the second fluid may be water delivered through a separate water nozzle on the fixture. In one embodiment, this water nozzle is provided on the second tube, preferably at the fore-end of the second tube.

The second delivery outlet may be arranged for connection to the respective fluid supply via a pipe which runs through the curved elbow duct. For example, the water nozzle may connect to the mains water supply via a pipe running through the curved elbow duct. This is a particularly compact arrangement.

The inserts may extend into the second tube, though this is not essential.

BRIEF DESCRIPTION OF THE DRAWINGS

Embodiments of the invention will now be described with reference to the drawings, in which.

DETAILED DESCRIPTION OF THE INVENTION

Figure 1:
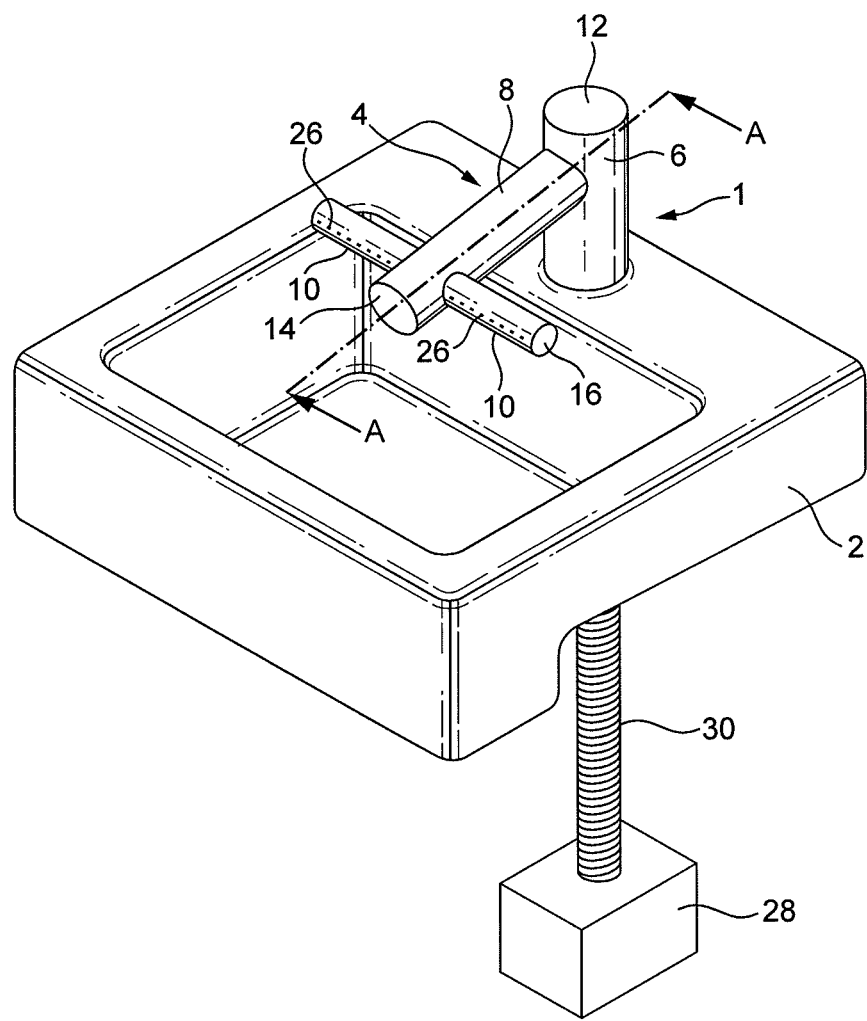
FIG. 1 is a perspective view of a fixture according to the present invention, here shown mounted on a sink.

FIG. 1 illustrates a fixture 1 mounted next to the basin of a sink 2.

The fixture 1 has a hollow metal body in the form of a tubular assembly 4 made up of four hollow, straight metal tubes: a first tube 6 which stands vertically on the sink 2, a second tube 8 which projects horizontally out from the first tube 6, over the basin of the sink 2, and two branch tubes 10 which extend out either side of the second tube 8.

The first and second tubes 6, 8 are cut from conventional rolled stainless steel tubing.

Figure 2:
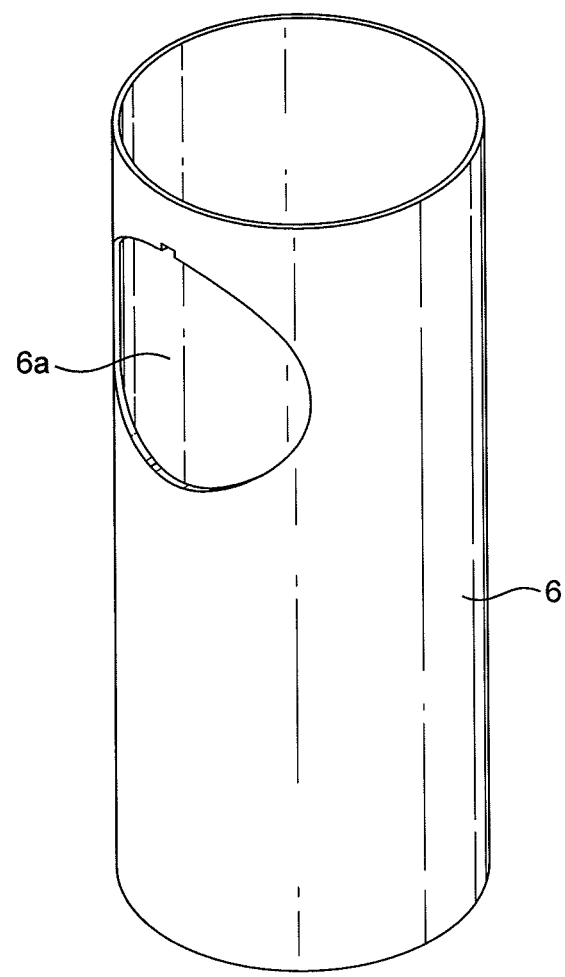
FIG. 2 is a perspective view of a first tube forming part of the body of the fixture.

The first tube 6 is shown on its own in FIG. 2. It comprises an opening 6a near its upper end.

Figure 3:
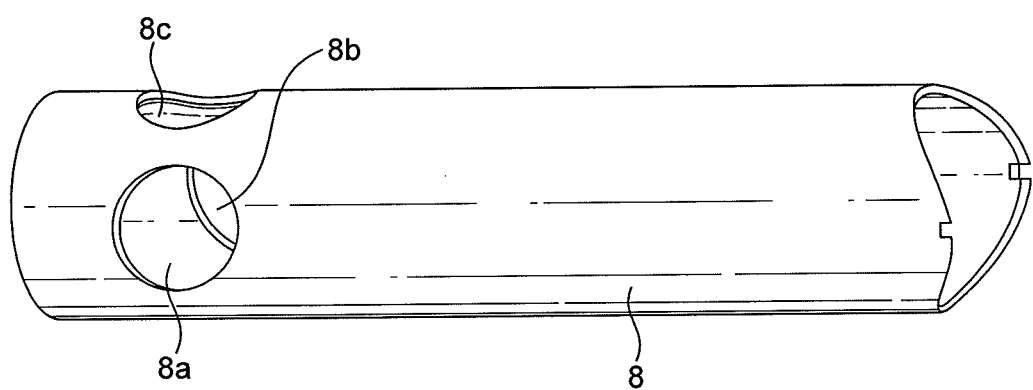
FIG. 3 is a perspective view of a second tube forming part of the body of the fixture.

The second tube 8 is shown on its own in FIG. 3. It comprises three openings towards its fore-end: two diametrically opposed openings 8a, 8b on the sides of the tube 8 and a third opening 8c on the underside of the tube 8 (the second tube 8 is illustrated upside-down in FIG. 3 so that the opening 8c is visible).

To form the hollow tubular assembly 4, the second tube 8 is welded or otherwise joined to the first tube 6 around the opening 6a on the first tube 6, and the branch tubes 10 are similarly joined to the second tube 8 around the respective openings 8a, 8b, 8c on the second tube 8.

The upper end of the first tube 6 is blanked off by a cap 12. A similar blanking cap 14 is used to blank off the fore-end of the second tube 8 and the branch ducts 10 are likewise blanked off using respective blanking caps 16 (only one of which is visible in FIG. 1).

The fixture 1 is mounted on the sink 2 via a hollow fixing stud 18 (FIG. 4), which is screwed into an internally threaded, annular blank 20 provided at the lower end of the first tube 6. This fixing stud 18 engages a locknut 22 underneath the sink 2 which screws up against the underside of the sink 2 to clamp the fixture in place.

The fixture 1 is configured for delivering both water for washing a user's hands and air for subsequently drying a user's hands.

The water is delivered through an aerator nozzle 24 mounted in the opening 18c. The air is delivered through separate air nozzles which take the form of holes 26 (FIG. 1) drilled or laser-cut into the walls of the branch ducts 10.

Both the water for washing and the air for drying are supplied separately through the hollow body of the fixture.

Figure 4:
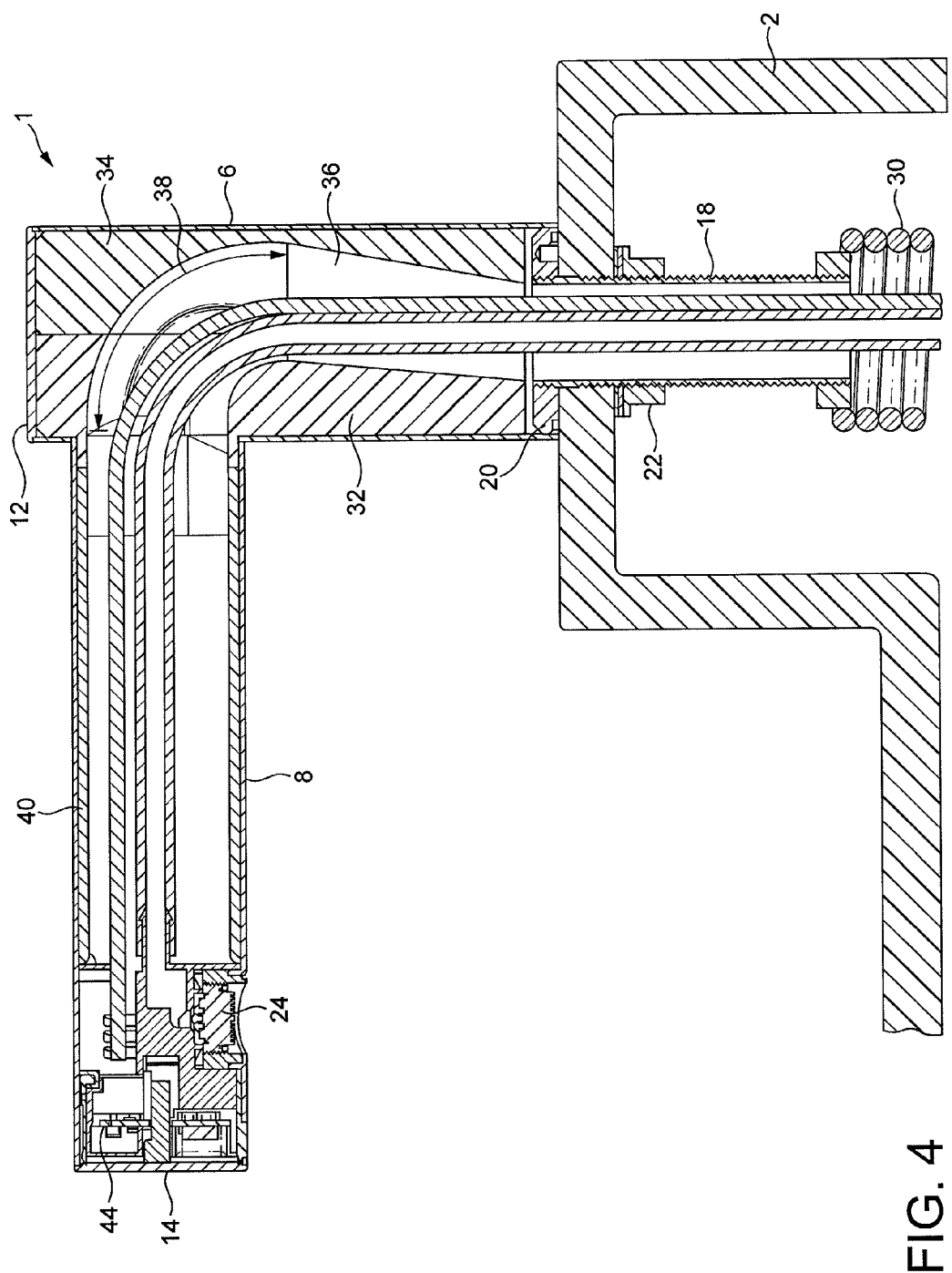
FIG. 4 is a sectional view along the line A-A in FIG. 1, showing the fixture, part of the sink and a mounting arrangement underneath the sink.

FIG. 4 shows the internal supply configuration for the air and water.

Air supply

The air is supplied through the hollow fixing stud 18, which acts as an air inlet. The air passes through the first tube 6, into the second tube 8 and then divides into the two branch ducts 10 before exiting through the air nozzles 26.

The air is supplied by a motor-driven fan unit 28 located under the sink 2 (see FIG. 1), which connects to the hollow stud 18 via a flexible hose 30.

Figure 5:
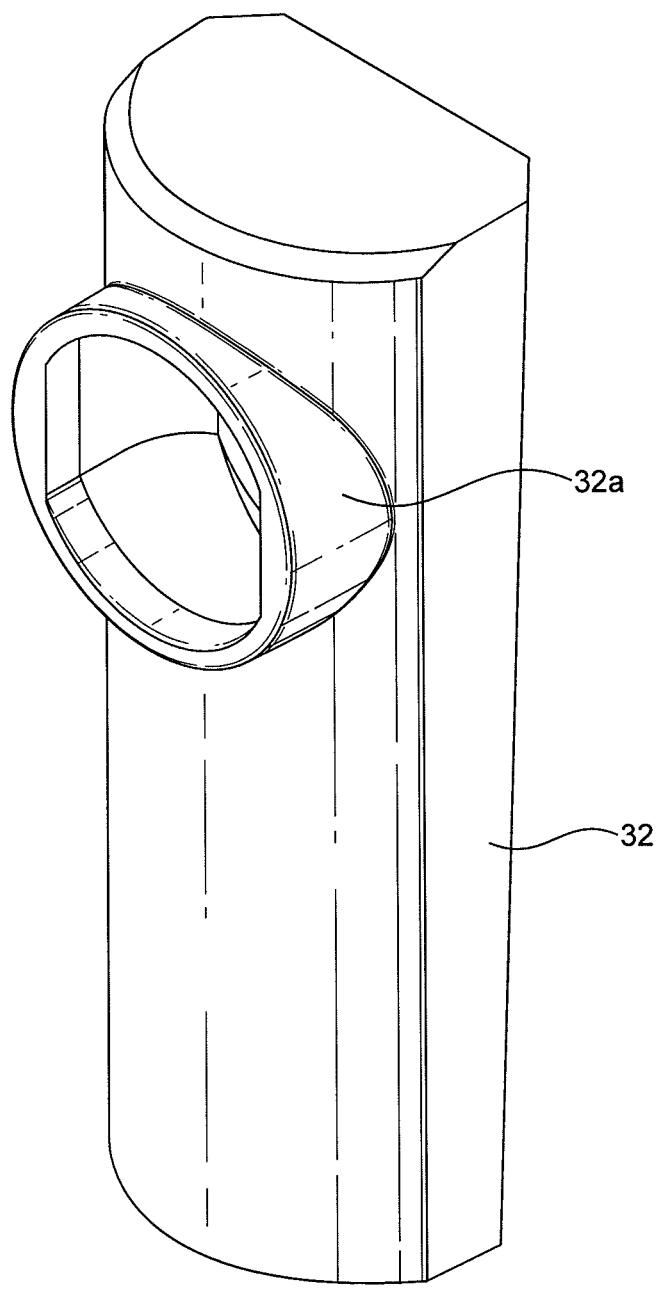
FIG. 5 is a perspective view of a first insert.
Figure 6:
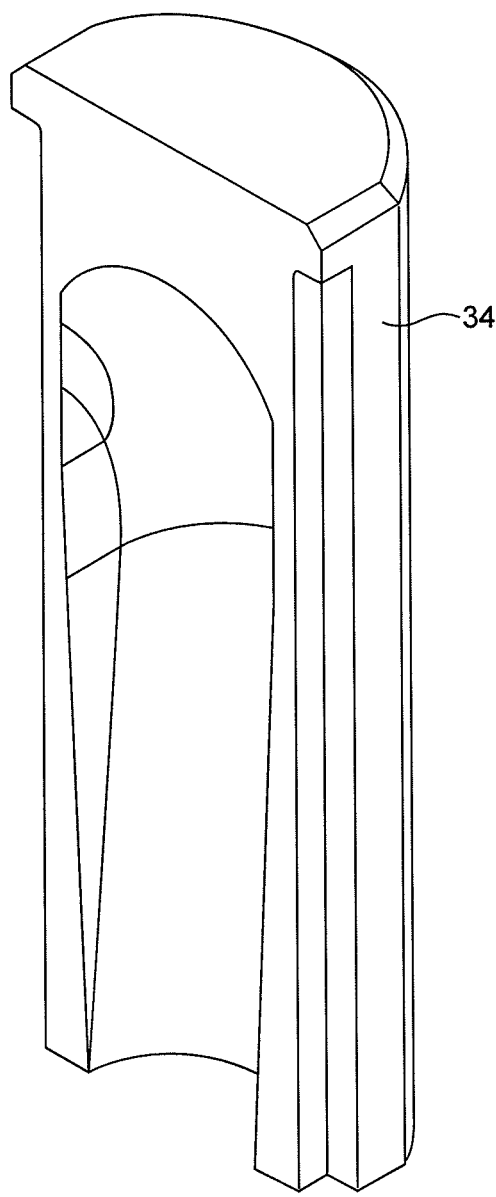
FIG. 6 is a perspective view of a second insert.

To reduce pressure losses inside the first tube 6, two inserts 32, 34 are provided. The first insert 32 is shown on its own in FIG. 5. The second insert 34 is shown on its own in FIG. 6.

The inserts 32, 34 fit together to form an internal air passage 36 inside the first tube 6. This air passage includes a curved elbow duct 38—shown in FIG. 4—in the region where the second tube joins the first tube. The curved elbow duct 38 reduces pressure losses inside the first tube 6 by turning the airflow gradually to guide it into the second tube 8.

The inserts 32, 34 themselves can be manufactured at low cost from a foam material such as expanded polystyrene (EPS). The use of foam also provides effective thermal insulation—reducing the surface temperature of the tube assembly—and noise absorption inside the first duct 6.

The inserts 32, 34 are initially inserted through the bottom end of the first tube 6 during assembly of the fixture 1, and engage the walls of the first tube 6 in a friction fit. The first insert 32 comprises a boss portion 32a which extends into the second tube 8 to help retain the first insert 32 in place: this necessitates the use of at least two inserts to allow initial location of the first insert in the second tube. Alternatively, the elbow duct 38 may be defined by a single insert which can be inserted up through the bottom of the first tube 6 but which does not extend into the second tube 8.

The boss 32a sits flush with a thermal liner 40 inside the second tube 8 to present a continuous surface for the airflow along the length of the second tube 8, though this is not essential.

Water supply

The water is supplied to the water nozzle 24 via a flexible pipe 42 which runs through the hollow fixing stud 18 and curved elbow duct 38. The flexible pipe 42 connects to a mains water supply via a stop valve (not shown).

Control

The fixture 1 is configured for "hands-free" operation, using a conventional sensor and control loop which automatically senses the presence of a user's hands and controls the fan unit 28 and the stop valve accordingly to dispense water and air. The control electronics 44 are housed at the fore-end of the second tube, and the cap 14 is preferably removable to provide easy access to the control electronics 44. Power is supplied to the control electronics 44 via a power line 46 which also runs through the curved elbow duct 38. Automatic operation is not essential: a manual stop valve in the water supply line may be provided inside the fixture, for example.

The air nozzles need not be provided on branch ducts. Alternatively, they may be provided on the second tube itself. Similarly, the water nozzle need not be provided on the second tube: it may for example be provide on a branch duct, similar to one of the branch ducts 10.

The invention claimed is:

1. A fixture for delivering a first fluid over the basin of a sink, the fixture comprising a supply inlet for the fluid and a delivery outlet for the fluid, the inlet being connected to the outlet through a hollow body of the fixture, the hollow body comprising two straight, hollow metal tubes: a first tube arranged to be mounted next to the basin of the sink in use, and a second tube joined to the wall of the first tube so as to project out over the basin of the sink in use, one or more inserts being provided inside the first metal tube, which inserts together define a curved elbow duct inside the first metal tube for guiding the fluid from the first metal tube into the second metal tube.

2. The fixture of claim 1 for additionally delivering a second fluid over the basin of the sink, the fixture comprising a second delivery outlet for delivery of the second fluid, the second delivery outlet arranged for connection to a supply of the second fluid.

3. The fixture of claim 2, wherein the second delivery outlet is connected to the supply of second fluid via a pipe which runs through the curved elbow duct.

4. The fixture of claim 1, wherein the inserts extend into the second tube.

5. An arrangement for drying a user's hands at a sink, the arrangement comprising the fixture of claim 1 in combination with a motor-driven fan unit, the delivery outlet being an air nozzle, and the fan unit being connected to the supply inlet for forcing drying air through the air nozzle via the curved elbow duct.

6. The arrangement of claim 5, the arrangement comprising a plurality of said air nozzles, at least one air nozzle being provided on each of two branch ducts extending from the second tube.

7. The arrangement of claim 5, wherein the inserts are foam inserts.

8. The arrangement of claim 7, wherein the inserts are Expanded Polystyrene (EPS) inserts.

9. The arrangement of claim 5, wherein the fixture additionally comprises a water delivery outlet connected to a water supply.

10. The arrangement of claim 9, wherein the water delivery outlet is connected to the water supply via a pipe running through the curved elbow duct.

11. The arrangement of claim 9, wherein the water delivery outlet is located on the second tube.

\* \* \* \* \*